(12) United States Patent
Jagadesan et al.

(10) Patent No.: US 7,949,006 B2
(45) Date of Patent: May 24, 2011

(54) SYSTEM AND METHOD FOR MEDIA BURST CONTROL OF DISCRETE CONTENT FOR PUSH-TO-CELLULAR COMMUNICATION

(75) Inventors: Balakumar Jagadesan, Glendale Heights, IL (US); Lawrence A. Willis, Mc Henry, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 421 days.

(21) Appl. No.: 11/743,348

(22) Filed: May 2, 2007

(65) Prior Publication Data
US 2008/0112431 A1    May 15, 2008

Related U.S. Application Data

(60) Provisional application No. 60/865,048, filed on Nov. 9, 2006.

(51) Int. Cl.
*H04L 12/42* (2006.01)
(52) U.S. Cl. .......................... 370/453; 455/518
(58) Field of Classification Search .................. 370/235, 370/350, 352, 349; 455/410, 518
See application file for complete search history.

(56) References Cited

U.S. PATENT DOCUMENTS

| | | | | |
|---|---|---|---|---|
| 5,872,540 | A * | 2/1999 | Casabona et al. | 342/362 |
| 6,442,748 | B1 * | 8/2002 | Bowman-Amuah | 717/108 |
| 6,628,844 | B1 * | 9/2003 | Benitz | 382/276 |
| 6,697,106 | B1 * | 2/2004 | Saito | 348/222.1 |
| 6,904,110 | B2 * | 6/2005 | Trans et al. | 375/350 |
| 7,017,175 | B2 * | 3/2006 | Alao et al. | 725/105 |
| 7,031,308 | B2 * | 4/2006 | Garcia-Luna-Aceves et al. | 370/390 |
| 7,292,164 | B1 * | 11/2007 | Wegener et al. | 341/76 |
| 7,505,448 | B2 * | 3/2009 | Sheng et al. | 370/350 |
| 7,542,522 | B2 * | 6/2009 | Ross et al. | 375/316 |
| 7,583,695 | B2 * | 9/2009 | Vimpari et al. | 370/466 |
| 2003/0229900 | A1 * | 12/2003 | Reisman | 725/87 |
| 2004/0100940 | A1 * | 5/2004 | Kuure et al. | 370/349 |
| 2005/0177463 | A1 * | 8/2005 | Crutchfield et al. | 705/27 |
| 2006/0080224 | A1 * | 4/2006 | Schuelke et al. | 705/37 |
| 2006/0085534 | A1 * | 4/2006 | Ralston et al. | 709/223 |
| 2006/0155839 | A1 * | 7/2006 | Hundscheidt et al. | 709/224 |
| 2006/0209694 | A1 * | 9/2006 | Chandhok et al. | 370/235 |
| 2006/0212526 | A1 * | 9/2006 | Subramanian et al. | 709/206 |
| 2006/0291452 | A1 * | 12/2006 | Velagaleti et al. | 370/352 |

(Continued)

OTHER PUBLICATIONS

Ruibiao Qiu, Fred Huhns, Jerome R. Cox, "A Conference Control Protocol for Highly Interactive Video-conferencing", Applied Research Laboratory Dewpartment of Computer Science, Washington University, Saint Louis, MO 63130, 5 pages.

*Primary Examiner* — Thong H Vu
(74) *Attorney, Agent, or Firm* — Hisashi D. Watanabe

(57) ABSTRACT

A wireless communication device, and a method thereof, for media burst control of discrete content for a push-to-cellular communication. One circuit of device communicates continuous data via a real time data, such as RTP. Another circuit communicates control information associated with the continuous data via a real time control protocol, such as RTCP. A third circuit communicates discrete data and control information associated with the discrete data via a non-real time protocol, such as MSRP. A request signal for floor control is transmitted by a first device and received by a second device via a non-real time protocol associated with discrete media. The discrete media is then transmitted by the first device and received by the second device via the non-real time protocol.

19 Claims, 3 Drawing Sheets

U.S. PATENT DOCUMENTS

| | | | |
|---|---|---|---|
| 2007/0112914 A1* | 5/2007 | Sung et al. | 709/205 |
| 2007/0127374 A1* | 6/2007 | Black | 370/229 |
| 2007/0133435 A1* | 6/2007 | Eneroth et al. | 370/260 |
| 2007/0195861 A1* | 8/2007 | Lee | 375/147 |
| 2008/0057993 A1* | 3/2008 | Crisler et al. | 455/518 |
| 2008/0076386 A1* | 3/2008 | Khetawat et al. | 455/410 |
| 2008/0320083 A1* | 12/2008 | Albertsson et al. | 709/205 |
| 2009/0016328 A1* | 1/2009 | Peisa et al. | 370/352 |
| 2009/0047915 A1* | 2/2009 | Albertsson | 455/90.2 |
| 2009/0280851 A1* | 11/2009 | Dostal et al. | 455/518 |
| 2010/0034149 A1* | 2/2010 | Lederer et al. | 370/329 |

* cited by examiner

SYSTEM AND METHOD FOR MEDIA BURST CONTROL OF DISCRETE CONTENT FOR PUSH-TO-CELLULAR COMMUNICATION

FIELD OF THE INVENTION

The present invention relates generally to the field wireless communication systems capable of communicating discrete content over a push-to-cellular connection. More particularly, the present invention is directed to a wireless communication system having a control mechanism to support and control communication of the discrete content over the push-to-cellular connection.

BACKGROUND OF THE INVENTION

In a half-duplex conferencing model, such as Push-to-talk over Cellular (PoC), at any given time only one person will be given the right to talk and others shall be in a listening mode. Each member explicitly requests the "Right-to-talk" in a given floor, and a PoC server arbitrates the requests and grants the floor based on certain rules. This mechanism of requesting, arbitrating and granting the Right-to-communicate is called the Floor control or Media Burst control. In order for the PoC architecture to address the multimedia requirements and use-cases specified in the PoC specification, the architecture supports a flexible floor control scheme that supports multiple floors for multiple media in a session, one floor for one or more media in a session, and grouping floors and media together.

The PoC architecture supports half-duplex conferencing using a SIP/IP core architecture, such as "walkie-talkie" like voice communication for person-to-person and group call scenarios. The PoC specification supports an extensible architecture to support continuous media, such as voice and video. In particular, the PoC specification includes a Real Time Protocol (RTP) for carrying continuous media and a Real Time Control Protocol (RTCP) for controlling and managing the flow of continuous media. RTCP was extended to support floor control functionality for PoC by embedding the floor control details in the RTCP APP specific messages. RTP/RTCP protocols were primarily engineered with the focus to support continuous media, and it currently utilizes the unreliable transport protocol UDP for voice. This introduces a potential bottle neck to transferring reliably discrete content, such as still images, text and data using the existing PoC architecture.

This is not the case for discrete media, such as still images and text. The PoC specification includes a Message Session Relay Protocol (MSRP) for carrying discrete media, but does not have any means for controlling the transfer of discrete media. MSRP is full-duplex, so it lacks floor control and content flow control schemes required for certain applications. With a focus to minimize effort, optimize mobile resources and avoid re-inventing solutions, it is preferable to reuse the protocols across different enablers. The MSRP protocol currently lacks the ability to support the half-duplex communication model and, in particular, lack the ability to enable floor control functionality to support half-duplex communication, like PoC.

Accordingly, there is a need for a protocol for half-duplex communication that provides a control mechanism for discrete media transfer by MSRP.

DETAILED DESCRIPTION OF THE EMBODIMENTS

The present invention provides capabilities to a half-duplex conferencing system, such as Push-to-talk over Cellular (PoC) or Push-to-X (PTX) systems, by using a non-real time protocol to add a control mechanism for discrete media transfer. An example of the non-real time protocol is MSRP, and an example of the control mechanism is floor control. The term floor control as used herein references the processes by which a PoC or PTX server controls access to a wireless communication device, such as a mobile station (MS), by granting, denying, revoking, and releasing access to communication resources of the server, and controlling the communications and flow of data between various devices during communications sessions. The embodiments of the present invention provide an improved control mechanism between a PoC or PTX server and communication devices of its associated call groups.

One aspect of the present invention is a method of a wireless communication device for media burst control of discrete content for a push-to-cellular communication. A request signal for floor control is transmitted by a first device and received by a second device via a non-real time protocol associated with discrete media. The discrete media is then transmitted by the first device and received by the second device via the non-real time protocol.

Another aspect of the present invention is a wireless communication device for media burst control of discrete content for a push-to-cellular communication. The device comprises a first circuit, a second circuit and a third circuit. The first circuit is configured to communicate continuous data via a real time data. The second circuit is configured to communicate control information associated with the continuous data via a real time control protocol. The third circuit is configured to communicate discrete data and control information associated with the discrete data via a non-real time protocol.

Figure 1:
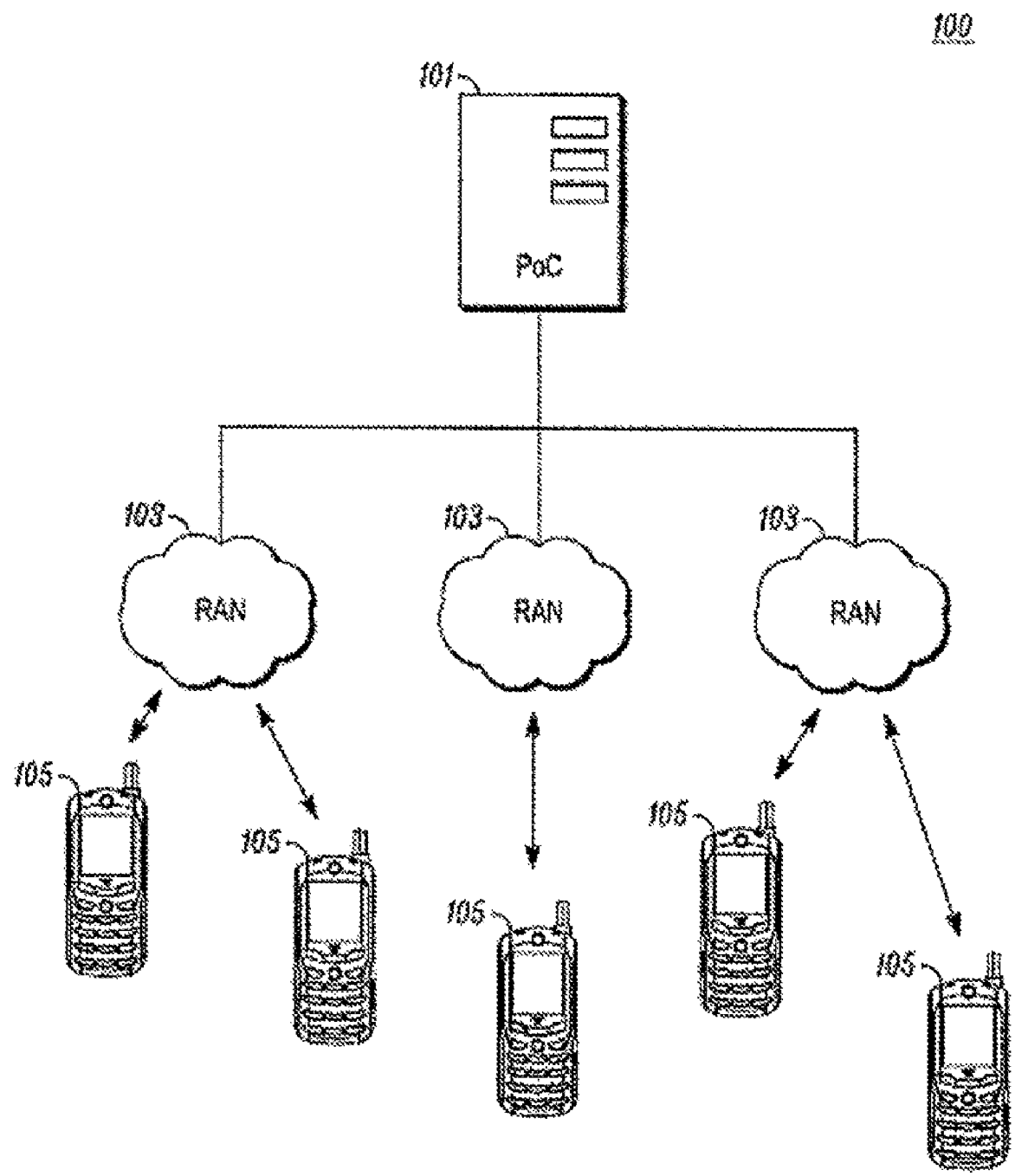
FIG. 1 is a perspective view of a preferred embodiment in accordance with the present invention.

Turning now to the drawings, FIG. 1 illustrates a PTX network 100 having a plurality of Radio Access Networks (RANs) 103. Each RAN 103 may further comprise a plurality of base station transceivers (BTS) and base station controllers (BSC) providing radio communications resources for establishing communications with a plurality of wireless communication devices or mobile stations 105. The plurality of RANs 103 are connected to, and able to communicate with, a Push-to-talk over cellular (PoC) server 101. The PoC server 101 is a logical network element and may be integrated into other physical network elements of a RAN and still remain in accordance with the present invention.

Further, the RAN and PoC server may represent a wireless local area network (WLAN) or wireless broadband network, employing various air interfaces such as but not limited to 802.11, 802.16, Bluetooth™, etc., wherein the plurality of mobile stations 105 may also have the capability of communicating over one or more wireless air interfaces including but not limited to GSM, GSM/EDGE, UMTS, CDMA2000, etc., such that a PTX session may be conducted using any of the air interfaces.

Turning now to the drawings, FIG. 1 illustrates a PTX network 100 having a plurality of Radio Access Networks (RANs) 103. Each RAN 103 may further comprise a plurality of base station transceivers (BTS) and base station controllers (BSC) providing radio communications resources for establishing communications with a plurality of mobile stations 105. The plurality of RANs 103 are connected to, and able to communicate with, a Push-to-talk over cellular (PoC) server 101. The PoC server 101 is a logical network element and may be integrated into other physical network elements of a RAN and still remain in accordance with the present invention.

Further, the RAN 103 and PoC server 101 may represent a wireless local area network (WLAN) or wireless broadband network, employing various air interfaces such as but not limited to 802.11, 802.16, Bluetooth™, etc., wherein the plurality of mobile stations 105 may also have the capability of communicating over one or more wireless air interfaces including but not limited to GSM, GSM/EDGE, UMTS, CDMA2000, etc., such that a PTX session may be conducted using any of the air interfaces.

Figure 2:
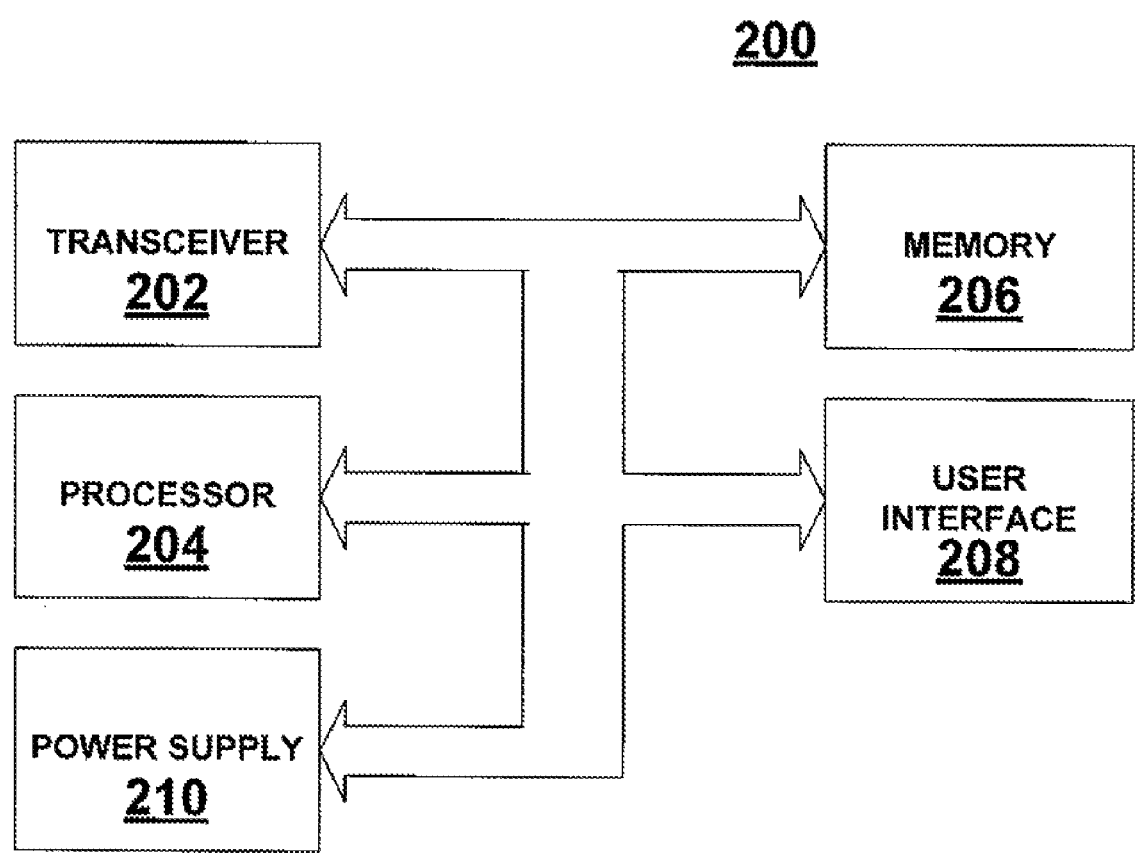
FIG. 2 is a block diagram illustrating the types of components that may be utilized by the devices of FIG. 1.

Referring to FIG. 2, there is provided a block diagram illustrating exemplary internal components 200 of each mobile device 105 in accordance with the present invention. The exemplary embodiment includes one or more wireless transceivers 202, a processor 204, a memory portion 206, and a user interface 208. The user interface 208 comprises one or more input devices and/or one or more output devices. Each transceiver 202 may utilize wireless technology for communication, such as the wireless communication links or connections described above. The internal components 200 may further include a power supply 210, such as a battery, for providing power to the other internal components while enabling the mobile device 105 to be portable.

The input and output devices 208 of the internal components 200 may include a variety of video, audio and/or mechanical outputs. For example, the output device(s) may include a video output device such as a liquid crystal display and light emitting diode indicator, an audio output device such as a speaker, alarm and/or buzzer, and/or a mechanical output device such as a vibrating mechanism. Likewise, by example, the input devices may include a video input device such as an optical sensor (for example, a camera), an audio input device such as a microphone, and a mechanical input device 226 such as a flip sensor, keyboard, keypad, selection button, touch pad, touch screen, capacitive sensor, motion sensor, and switch. Actions that may actuate one or more input devices include, but not limited to, opening the wireless communication device, unlocking the device, moving the device to actuate a motion, moving the device to actuate a location positioning system, and operating the device.

The memory portion 206 of the internal components 200 may be used by the processor 204 to store and retrieve data. The data that may be stored by the memory portion 206 include, but is not limited to, operating systems, applications, and data. Each operating system includes executable code that controls basic functions of the communication device, such as interaction among the components of the internal components 200, communication with external devices via the transceiver 202, and storage and retrieval of applications and data to and from the memory portion 206. The operating system includes various types of data communication protocols for carrying and controlling media, such as Real Time Protocol (RTP) and Real Time Control Protocol (RTCP) for continuous media and Message Session Relay Protocol (MSRP) for discrete media. Each application includes executable code utilizes an operating system to provide more specific functionality for the communication device. Data is non-executable code or information that may be referenced and/or manipulated by an operating system or application for performing functions of the communication device.

It is to be understood that FIG. 2 is for illustrative purposes only and is for illustrating components of a mobile device in accordance with the present invention, and is not intended to be a complete schematic diagram of the various components required for a mobile device. Therefore, a mobile device may include various other components not shown in FIG. 2 and still be within the scope of the present invention.

Figure 3:
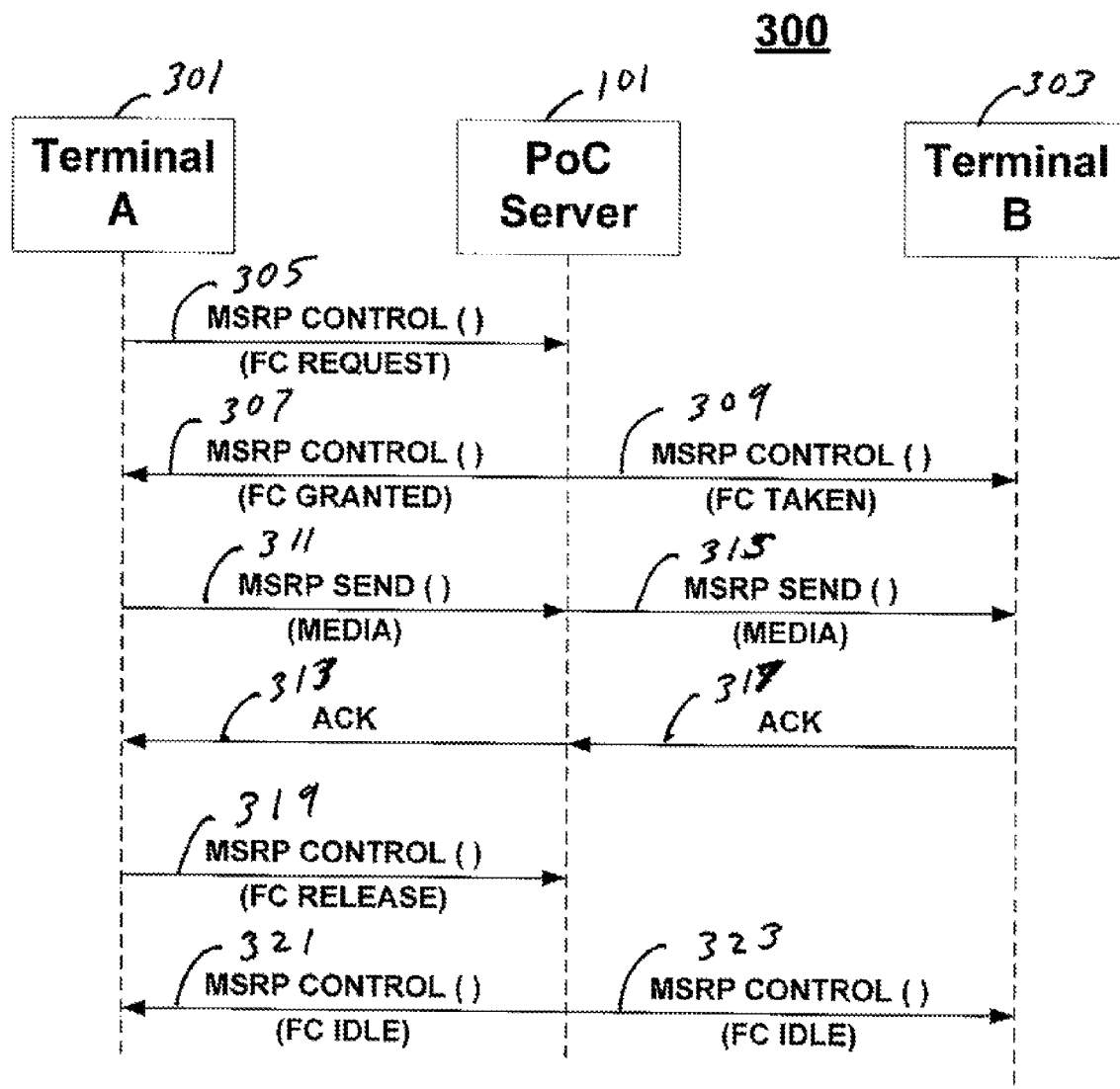
FIG. 3 is a timing diagram illustrating communications that may occur between the devices of FIG. 1.

Referring to FIG. 3, there is shown a timing diagram illustrating basic communication operations that may occur among two or more devices. PoC communication, or other forms of PTX communication, may be supported by one or more PoC or PTX servers, as represented by FIG. 3, or may be implement via a distributed, ad hoc communication network of mobile stations. As shown in FIG. 3, the PoC communication network 300 may include a central PoC server 101 and a plurality of wireless communication devices or mobile stations, such as Terminals A and B 301, 303. FIG. 3 illustrates a possible use case that may be realized using one or more embodiments of the present invention. It is to be understood that FIG. 3 does not show all of the messages that flow between the mobile stations and the server, but only shows the messages necessary for understanding the embodiments of the present invention.

For the illustrative operations shown in FIG. 3, Terminal A 301 and Terminal B are engaged in a PTT session over a communication network, such as RAN 103, with a PoC server 101. For one operation, Terminal A 301 may request the floor of the PTT session for a given discrete media type in step 305 by transmitting a floor control request signal, in the form of an MSRP control signal, to the PoC server 101. The request may be initiated by a user of Terminal A 301, for example, by selecting an activation button or sensor of Terminal A. Steps 307, 309, which are shown bi-directionally transmitted from the PoC server 101 to Terminals A and B 301, 303, represent notification by the PoC server to the mobile stations of a particular session, after determining whether resources are available for floor control by one or more mobile stations. Therefore, the resource determination is invoked in response to receipt of the floor request signal by server 201, and floor control priorities may be assigned to each mobile station of the session. Further, in steps 307, 309, if the floor request can be granted to the requesting mobile station, such as Terminal A 301, then the PoC server 101 forwards appropriate notification messages to other mobile stations of the talk group or session, such as Terminal B 303. The floor control grant signal to Terminal A 301 and the floor control notification signal to Terminal B 303 may be in the form of MSRP control signals. It should be noted that a floor deny message (not shown) may be appropriate in step 307 if the floor or resources are not available or if other criteria are not met.

Once a mobile device obtain control of a floor by receiving a floor control grant signal, the mobile station may then proceed to transmit discrete media to the other devices of the session at step 311. For example, for the embodiment shown by FIG. 3, Terminal A 301 may send discrete media to PoC server 201 in the form of an MSRP control signal. In response to receiving the discrete media, the PoC server 201 may send an acknowledgment signal back to the sending mobile device, at step 313, to indicate that the discrete media content was received. In addition, the receiving devices, such as PoC server 201, may forward the received media content to other devices of the session, such as Terminal B 303, at step 315. Likewise, the receiving mobile device(s) may send an acknowledgment signal back to the PoC server 201, at step 317, in response to receiving the discrete media.

At some point during the session with the call group, the mobile device having floor control may decide to terminate the session. At that time, the mobile device may send a floor control release signal at step 319. For example, Terminal A 301 may send a floor control release signal in the form of an MSRP control signal to the PoC server 101. In response, one or more devices may revoke floor control room from the sending mobile device and indicate the same to the sending mobile device at step 321 and other devices of the session at step 323. For example, PoC server 101 may send a floor control idle signal in the form of an MSRP control signal to Terminals A and B 301, 303, so that these mobile devices will know that at least one floor is available for the session.

Floor control functionality for managing discrete media may be enabled in a non-real time protocol, such the MSRP protocol, in a variety of ways. In one embodiment, the floor control functionality may be enabled in the header and body of a message by using an existing MSRP command, specifying an application specific MIME type in the header, and providing floor control data in the body of the file. For example, the SEND command is used in MSRP to transfer any type of content or data between MSRP end points, the REPORT command is used in MSRP to communicate the status of content or data being transferred, and the NON-SEND command is used in MSRP to manager security and other aspects of transferring content or data. Thus, an application control indicator, associated with control commands for transferring discrete content, may be provided at the MSRP Content-Type header field in the MSRP SEND command or NON-SEND command. MSRP Content-description field in the body of the MSRP SEND or NON-SEND commands may be tailored or specified for floor control usage. Support for application specific content types with other participating handsets in the session may be ensured through Accept type's header field in the MSRP SEND command. The floor control commands supported by the application may be defined in a separate schema.

In another embodiment, the floor control functionality may be enabled in the header and body of a message by specifying a new MSRP method in the header for supporting floor control requirements of applications and providing floor control data in the body.

In addition to enabling Floor control functionality to a non-real time protocol, such as MSRP, each MSRP message may also specify the sub-level of control commands to the associated MSRP content. These sub-control commands may regulate the flow and timing of the associated content. Some applications download the entire content before rendering. In such cases, after the content is downloaded, the flow may be regulated by the MSRP messages. Examples of the flow to be regulated include, but are not limited to, timing, pause, start, stop, user input, and the like. Similarly, certain applications may require each part of multi-part content, and the associated sub-control features, to be transferred simultaneously. The context owner shares and controls the content viewed by all member devices in a session of a call group.

The present invention has many different applications for PoC communication and the like. For one embodiment, in a Push-To-X (PTX) group call, a person operating one wireless communication device may share discrete media, such as a photo taken in Paris, and receive comments from users of other communication devices. The concept of floor control for discrete media, such as still images, prevents other users from sending discrete media to the participants of the group call at the same time. The owner of the context or floor is able to share his/her discrete media at every terminal participating in the group call.

For another embodiment, again in a PTX group call, a person operating a wireless communication device may wish to share multiple discrete media, such as pictures, a set of slides, a play-list of music, or pod-cast songs. Utilizing the present invention, the person may have the ability to request the floor and control the flow of the multimedia content, such as moving from slide-to-slide in a deck of slides.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of a wireless communication device for media burst control of discrete content for a push-to-cellular communication, the method comprising:
transmitting a request signal for floor control via a non-real time protocol associated with discrete media, wherein the discrete media includes at least one image; and
transmitting the discrete media via the non-real time protocol after transmitting the request signal for floor control via the non-real time protocol;
transmitting a release signal for floor control via the non-real time protocol; and
receiving an idle signal for floor control via the non-real time protocol in response to transmitting the release signal for floor control via the non-real time protocol.

2. The method of claim 1, further comprising:
receiving a grant signal for floor control via the non-real time protocol in response to transmitting the request signal for floor control via the non-real time protocol; and
receiving an acknowledgment signal of the discrete media via the non-real time protocol in response to transmitting the discrete media via the non-real time protocol.

3. The method of claim 1, further comprising:
transmitting a request signal for floor control via a real time control protocol associated with continuous media; and
transmitting the continuous media via a real time data protocol after transmitting the request signal for floor control via the real time control protocol.

4. The method of claim 1, wherein:
transmitting a request signal for floor control via a non-real time protocol includes transmitting the request signal for floor control via a message session relay protocol; and
transmitting discrete media via the non-real time protocol includes transmitting the discrete media via the message session relay protocol.

5. The method of claim 1, wherein transmitting a request signal for floor control includes transmitting a message by using an existing non-real time protocol command, the message including a header specifying an application control type and a body providing floor control data, the application control type being an application specific MIME type as part of an accept types field in the header.

6. The method of claim 1, wherein transmitting a request signal for floor control includes transmitting a message by using an additional non-real time protocol command, the message including a header supporting at least one floor control requirement and a body providing floor control data.

7. A method of a wireless communication device for media burst control of discrete content for a push-to-cellular communication, the method comprising:
receiving a request signal for floor control via a non-real time protocol associated with discrete media, wherein the discrete media includes at least one image; and receiving the discrete media via the non-real time protocol after receiving the request signal for floor control via the non-real time protocol;

receiving a release signal for floor control via the non-real time protocol; and transmitting an idle signal for floor control via the non-real time protocol in response to receiving the release signal for floor control via the non-real time protocol.

8. The method of claim 7, further comprising:

transmitting a grant signal for floor control via the non-real time protocol in response to receiving the request signal for floor control via the non-real time protocol; and transmitting an acknowledgment signal of the discrete media via the non-real time protocol in response to receiving the discrete media via the non-real time protocol.

9. The method of claim 7, further comprising:

receiving a request signal for floor control via a real time control protocol associated with continuous media; and receiving the continuous media via a real time data protocol after receiving the request signal for floor control via the real time control protocol.

10. The method of claim 7, wherein:

receiving a request signal for floor control via a non-real time protocol includes receiving the request signal for floor control via a message session relay protocol; and receiving discrete media via the non-real time protocol includes receiving the discrete media via the message session relay protocol.

11. The method of claim 7, wherein receiving a request signal for floor control includes receiving a message by using an existing non-real time protocol command, the message including a header specifying an application control type and a body providing floor control data, the application control type being an application specific MIME type as part of an accept types field in the header.

12. The method of claim 7, wherein receiving a request signal for floor control includes receiving a message by using an additional non-real time protocol command, the message including a header supporting at least one floor control requirement and a body providing floor control data.

13. A wireless communication device for media burst control of discrete content for a push-to-cellular communication comprising:

a first circuit configured to communicate continuous data via a real time data;

a second circuit configured to communicate control information associated with the continuous data via a real time control protocol; and a third circuit configured to communicate discrete data and control information associated with the discrete data via a non-real time protocol, wherein the discrete data includes at least one image;

wherein the control information associated with the discrete data includes floor control signals; and wherein the floor control signals includes a floor control request signal, a floor control release signal, and a floor control idle signal.

14. The wireless communication device of claim 13, wherein the continuous data includes voice media and video media.

15. The wireless communication device of claim 13, wherein the third circuit communicates the discrete data via a first command of the non-real time protocol and the control information associated with the discrete data via a second command of the non-real time protocol, the first and second commands being different from each other.

16. The wireless communication device of claim 13, wherein the third circuit communicates the discrete data via a first sub-type of a particular command of the non-real time protocol and the control information associated with the discrete data via a second sub-type of the particular command of the non-real time protocol.

17. The wireless communication device of claim 13, wherein the real time data protocol is RTP, the real time control protocol is RTCP, and the non-real time protocol is MSRP.

18. The method of claim 13, wherein the third circuit communicates a message by using an existing non-real time protocol command, the message including a header specifying an application control type and a body providing floor control data, the application control type being an application specific MIME type as part of an accept types field in the header.

19. The method of claim 13, wherein communicates a message by using an additional non-real time protocol command, the message including a header supporting at least one floor control requirement and a body providing floor control data.

* * * * *